United States Patent
Kobayashi

(10) Patent No.: US 10,214,175 B2
(45) Date of Patent: Feb. 26, 2019

(54) VEHICLE AIRBAG DEVICE

(71) Applicant: TOYOTA JIDOSHA KABUSHIKI KAISHA, Aichi-ken (JP)

(72) Inventor: Ippei Kobayashi, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/610,624

(22) Filed: Jun. 1, 2017

(65) Prior Publication Data

US 2017/0355346 A1    Dec. 14, 2017

(30) Foreign Application Priority Data

Jun. 13, 2016    (JP) .................................. 2016-116792

(51) Int. Cl.
*B60R 21/231* (2011.01)
*B60R 21/2338* (2011.01)
(Continued)

(52) U.S. Cl.
CPC ...... *B60R 21/2338* (2013.01); *B60R 21/0136* (2013.01); *B60R 21/231* (2013.01); *B60R 21/205* (2013.01); *B60R 21/264* (2013.01); *B60R 2021/0004* (2013.01); *B60R 2021/0023* (2013.01); *B60R 2021/0048* (2013.01); *B60R 2021/01013* (2013.01);
(Continued)

(58) Field of Classification Search
CPC .............. B60R 21/2338; B60R 21/233; B60R 2021/23382; B60R 2021/0023
See application file for complete search history.

(56) References Cited

U.S. PATENT DOCUMENTS 9,187,055 B1 * 11/2015 Genthikatti ......... B60R 21/2338
9,796,354 B1 * 10/2017 Hayashi ................ B60R 21/239
(Continued)

FOREIGN PATENT DOCUMENTS

JP    2016-20115 A    2/2016
JP    2016-40154 A    3/2016
(Continued)

OTHER PUBLICATIONS

Hisayuki Nagatsu, Passenger Protection Device of Vehicle, Mar. 22, 2016, JPO, JP 2016-037135 A, English Abstract (Year: 2016).*
(Continued)

*Primary Examiner* — James A English
(74) *Attorney, Agent, or Firm* — Hauptman Ham, LLP

(57) ABSTRACT

The present disclosure provides a vehicle airbag device including: an airbag that inflates and deploys due to supply of gas, that has a main body and a projection that projects in a vehicle rearward direction, and that has a gap portion, between the main body and the projection, which opens in the vehicle rearward direction; and a coupling portion that couples together a first attachment portion set at the airbag at a front end portion side of the gap portion and a second attachment portion set at a side portion of the projection, and which, when inflation and deployment of the airbag, stretches between the first attachment portion and the second attachment portion, which is positioned further in the vehicle rearward direction than the first attachment portion.

7 Claims, 9 Drawing Sheets

(51) Int. Cl.
*B60R 21/0136* (2006.01)
*B60R 21/205* (2011.01)
*B60R 21/264* (2006.01)
*B60R 21/00* (2006.01)
*B60R 21/01* (2006.01)
*B60R 21/235* (2006.01)

(52) U.S. Cl.
CPC ............... *B60R 2021/01286* (2013.01); *B60R 2021/23382* (2013.01); *B60R 2021/23509* (2013.01); *B60R 2021/23576* (2013.01)

(56) References Cited

U.S. PATENT DOCUMENTS

| | | | |
|---|---|---|---|
| 2016/0009242 A1* | 1/2016 | Fukawatase | B60R 21/2338 280/730.1 |
| 2016/0046254 A1* | 2/2016 | Yamada | B60R 21/233 280/729 |
| 2016/0046257 A1 | 2/2016 | Yamada et al. | |
| 2016/0207490 A1* | 7/2016 | Yamada | B60R 21/2338 |
| 2017/0036639 A1* | 2/2017 | Yamada | B60R 21/205 |
| 2017/0129444 A1* | 5/2017 | Fukawatase | B60R 21/233 |
| 2017/0158154 A1* | 6/2017 | Kobayashi | B60R 21/01332 |
| 2018/0154856 A1* | 6/2018 | Yamada | B60R 21/205 |
| 2018/0154857 A1* | 6/2018 | Yamada | B60R 21/216 |

FOREIGN PATENT DOCUMENTS

| | | |
|---|---|---|
| JP | 2016037135 A | 3/2016 |
| JP | 2016040155 A | 3/2016 |

OTHER PUBLICATIONS

Hisayuki Nagatsu, Passenger Protection Device of Vehicle, Mar. 22, 2016, JPO, JP 2016-037135 A, Machine Translation of Description (Year: 2016).*

* cited by examiner

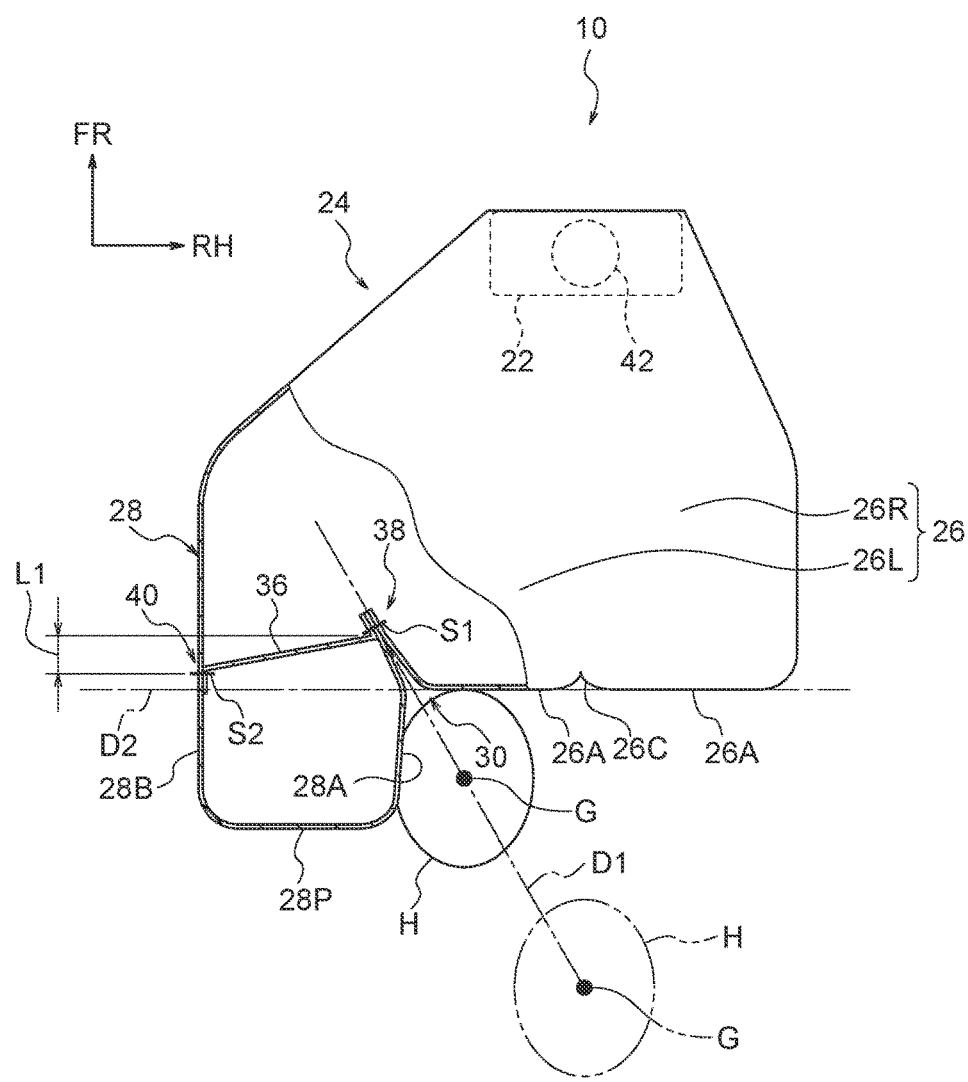

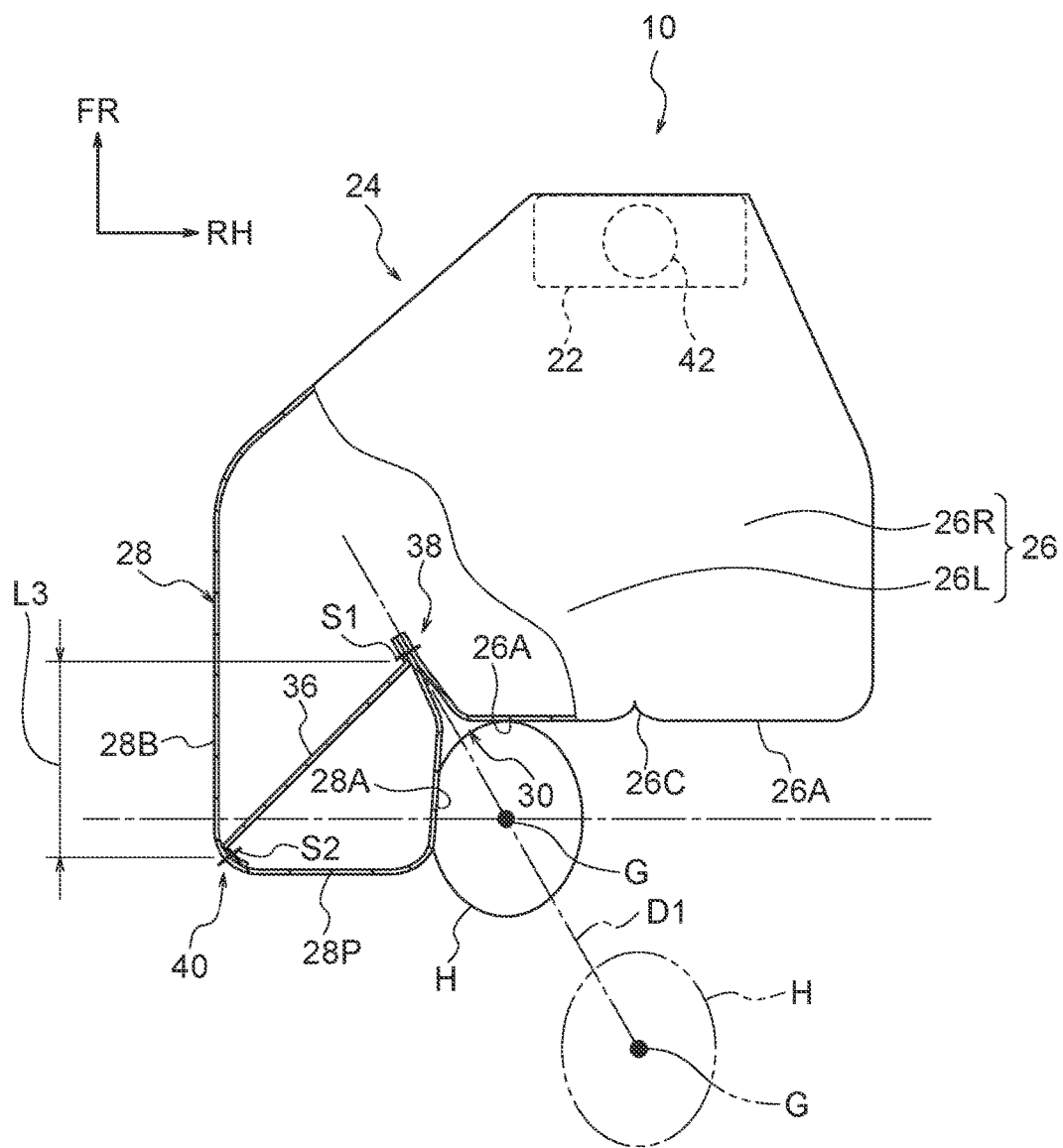

VEHICLE AIRBAG DEVICE

CROSS-REFERENCE TO RELATED APPLICATION

This application claims priority under 35 USC 119 from Japanese Patent Application No. 2016-116792, filed on Jun. 13, 2016, the disclosure of which is incorporated by reference herein.

BACKGROUND

Technical Field

The present disclosure relates to a vehicle airbag device that causes an airbag to inflate and deploy at the vehicle front side of an occupant.

Related Art

Japanese Patent Application Laid-open (JP-A) No. 2016-040154 discloses a front passenger seat airbag device in which a bag main body of an airbag including a main body that becomes inflated and deployed in front of the head of an occupant seated in the vehicle seat, and including a projection that becomes inflated and deployed at the vehicle width direction inner side of the main body. The projection projects in the vehicle rearward direction beyond a frontal impact restraining surface (occupant restraining surface) of the main body and, at the time of an oblique impact to the vehicle, restrains the head of the occupant from the side (impact side).

In connection to the airbag described above, there is a configuration in which a gap portion that opens in the vehicle rearward direction is formed between the inflated and deployed main body and projection. The gap portion is formed such that the head of the occupant moves into it at the time of an oblique impact to the vehicle. The head becomes sandwiched in the gap portion, and thus the head is restrained from turning about the axis of the neck, and the occupant protection performance is improved. However, in a case in which the head moves into the gap portion until it bottoms in the front end portion of the gap portion, there is the potential for the projection to become unable to hold its shape, so that it collapses to the opposite side of the main body side. Such a collapse of the projection has the potential to diminish the effect of restraining the head from turning.

SUMMARY

The present disclosure provides a vehicle airbag device that, in a configuration in which a gap portion that opens in the vehicle rearward direction is formed between an inflated and deployed main body and projection of the vehicle airbag device, may prevent or restrain the projection from collapsing to the opposite side of the main body side in a case in which the head of an occupant has moved into the gap portion.

A first aspect of the present disclosure is a vehicle airbag device including: an airbag that inflates and deploys due to receiving a supply of gas, that has a main body that inflates and deploys at a vehicle front side of an occupant and a projection that inflates and deploys at a vehicle width direction side of the main body and projects in a vehicle rearward direction beyond the main body, and that has a gap portion, between the main body and the projection, which opens in the vehicle rearward direction; and a coupling portion that couples together a first attachment portion set at the airbag at a front end portion side of the gap portion and a second attachment portion set at a side portion of the projection, which is opposite to the main body side, and which, at a time of the inflation and deployment of the airbag, stretches between the first attachment portion and the second attachment portion, which is positioned further in the vehicle rearward direction than the first attachment portion.

In the first aspect, when, for example, there is a frontal impact to the vehicle, the airbag receives a supply of gas to become inflated and deployed. The airbag has the main body, which becomes inflated and deployed on the vehicle front side of the occupant, and the projection, which becomes inflated and deployed on one vehicle width direction side of the main body and projects in the vehicle rearward direction beyond the main body. In this airbag, the gap portion that opens in the vehicle rearward direction is formed between the main body and the projection. The head of the occupant moves into this gap portion in a case in which, for example, the type of the frontal impact is an oblique impact on the one vehicle width direction side.

Here, in the first aspect, the first attachment portion set at the airbag on the front end portion side of the gap portion and the second attachment portion set at the side portion of the projection on the opposite side of the main body side are coupled together by the coupling portion. Additionally, at the time of the inflation and deployment of the airbag, the coupling portion becomes stretched between the first attachment portion and the second attachment portion positioned further in the vehicle rearward direction than the first attachment portion. For this reason, when the head of the occupant that has moved into the gap portion bottoms in the front end portion of the gap portion, tension acting on the coupling portion increases, and the projection receives a force toward the other vehicle width direction side. Accordingly, the projection may be prevented or restrained from collapsing to the one vehicle width direction side (the opposite side of the main body side).

A second aspect, in the above first aspect, a surface of the main body, that faces the vehicle rearward direction at the time of the inflation and deployment, may be an occupant restraining surface; and the second attachment portion may be positioned further in the vehicle rearward direction than a rear end of the occupant restraining surface at the time of the inflation and deployment.

In the second aspect, the second attachment portion, which is the point at which the tension acts on the projection from the coupling portion, is positioned further in the vehicle rearward direction than the rear end of the occupant restraining surface (the surface that faces the vehicle rearward direction) of the main body at the time of the inflation and deployment of the airbag. Accordingly, compared to a configuration in which the second attachment portion is positioned further in the vehicle forward direction than the rear end of the occupant restraining surface at the time of the inflation and deployment of the airbag, it becomes easier for the tension acting on the coupling portion to rapidly increase when the head of the occupant has bottomed in the front end portion of the gap portion. Thus, in the second aspect, the effect of preventing or restraining a collapse of the projection may be enhanced.

A third aspect, in the above first aspect, in a state in which a head of an AM50 dummy serving as the occupant has come into contact with the occupant restraining surface at the time of the inflation and deployment, the second attachment portion may be positioned further in the vehicle rearward direction than a center of gravity of the head of the AM50 dummy.

In the third aspect, the second attachment portion, which is the point at which the tension acts on the projection from the coupling portion, is positioned further in the vehicle rearward direction than the center of gravity of the head of the AM50 dummy in the above-described state. Accordingly, compared to a configuration in which the second attachment portion is positioned further in the vehicle forward direction than the center of gravity in the above-described state, it becomes easier for the tension acting on the coupling portion to rapidly increase when the head of the occupant has bottomed in the front end portion of the gap portion. Thus, in the third aspect, the effect of preventing or restraining a collapse of the projection may be enhanced even more.

As described above, the vehicle airbag device according to the present disclosure, which has a configuration in which a gap portion that opens in the vehicle rearward direction is formed between an inflated and deployed main body and projection, may prevent or restrain the projection from collapsing to the opposite side of the main body side in a case in which the head of an occupant has moved into the gap portion.

BRIEF DESCRIPTION OF THE DRAWINGS

An exemplary embodiment will be described in detail based on the following figures, wherein:

FIG. 5A is a partial sectional view, corresponding to FIG. 3, illustrating a case in which a second attachment portion is positioned further in the vehicle forward direction than an occupant restraining surface of a bag main body portion at the time of the inflation and deployment of the airbag;

FIG. 5C is a partial sectional view, corresponding to FIG. 3, illustrating a state in which the head of an AM50 dummy has come into contact with the occupant restraining surface of the bag main body portion of the airbag, and the second attachment portion is positioned further in the vehicle rearward direction than the center of gravity of the head of the AM50 dummy;

DETAILED DESCRIPTION

Figure 1:
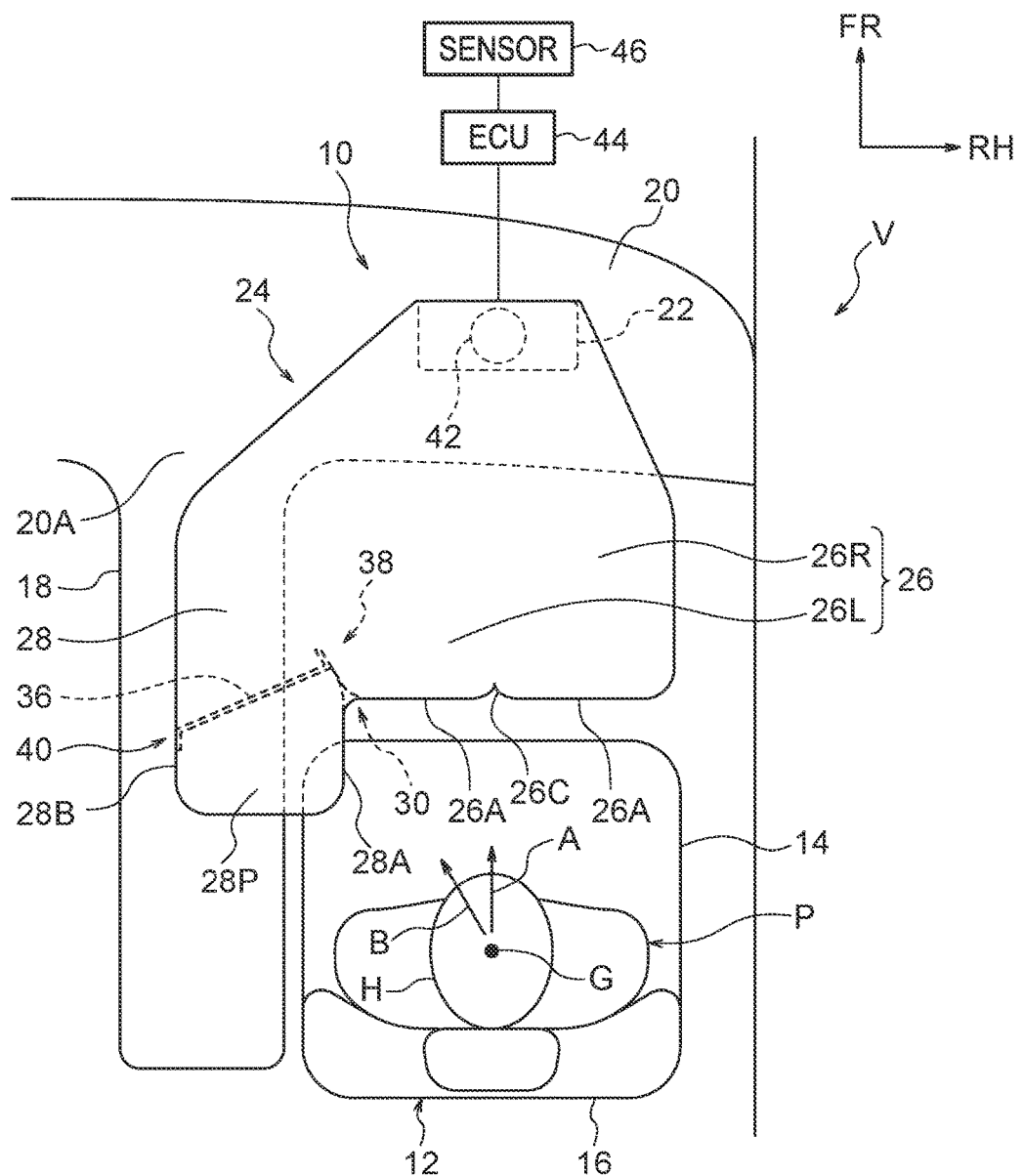
FIG. 1 is a plan view illustrating the right side portion of the front portion of a cabin of a vehicle to which a vehicle airbag device according to the exemplary embodiment has been applied, and illustrates an inflated and deployed state of an airbag.
Figure 2:
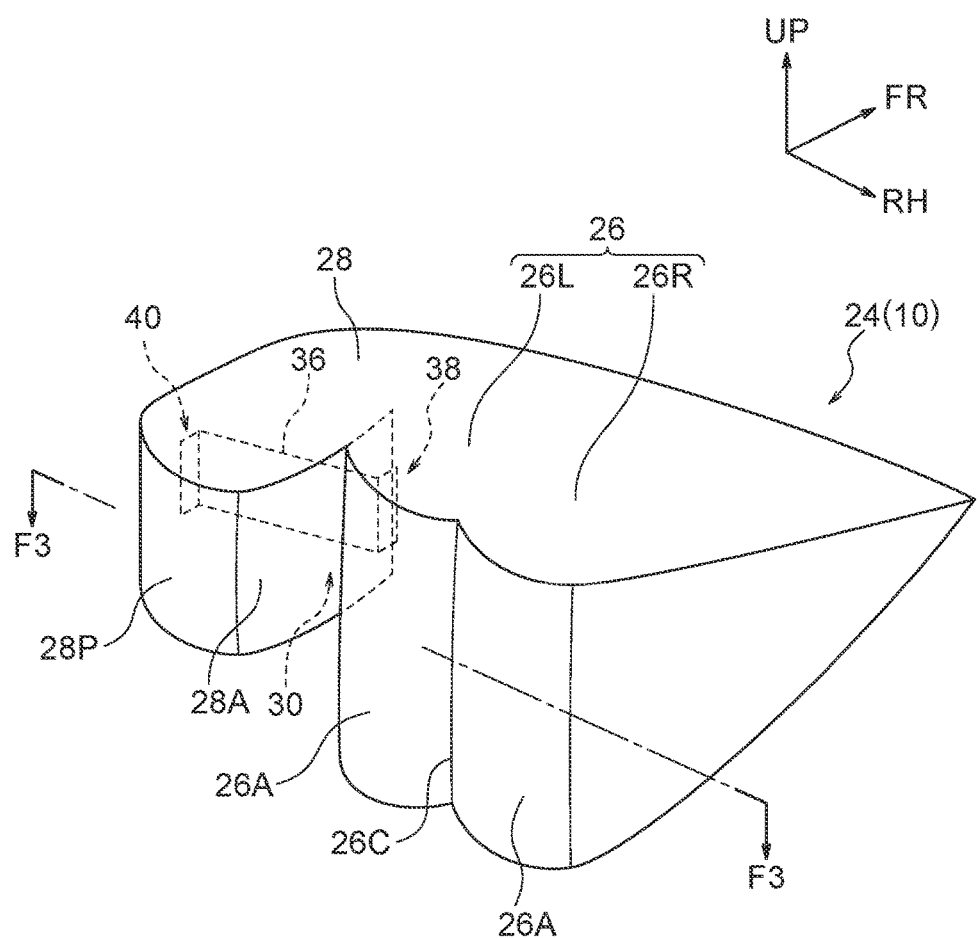
FIG. 2 is a perspective view illustrating the inflated and deployed state of the airbag.

A front passenger seat airbag device 10 serving as a vehicle airbag device according to an exemplary embodiment of the present disclosure will be described below using FIG. 1 to FIG. 6B. Note that arrow FR, arrow UP, and arrow RH appropriately illustrated in the drawings indicate a forward direction, an upward direction, and a rightward direction, respectively, of an automobile (vehicle) V (see FIG. 1) to which the front passenger seat airbag device 10 has been applied. Here, description is given below simply using the directions of front/rear, upper/lower, and right/left, unless otherwise specified these will be understood to mean front/rear in the vehicle forward and rearward direction, upper/lower in the vehicle vertical direction, and right/left in the vehicle rightward and leftward direction (the vehicle width direction). First the general configuration of the automobile V interior and the general configuration of the front passenger seat airbag device 10 will be described, and then the relevant portions of the exemplary embodiment will be described.

FIG. 1 illustrates, in a schematic plan view, the right side portion of the front portion of a cabin C interior in the automobile V to which the front passenger seat airbag device 10 has been applied. Note that FIG. 1 illustrates a state in which an airbag 24 of the front passenger seat airbag device 10 is inflated and deployed. As illustrated in FIG. 1, a vehicle seat 12 for a front passenger seat is disposed in the right side portion of the front portion of the cabin C. The vehicle seat 12 is configured to include a seat cushion 14, on which an occupant P (hereinafter called the "front passenger seat occupant P") sits, and a seat back 16, which supports the back of the front passenger seat occupant P. The lower end portion of the seat back 16 is coupled to the rear end portion of the seat cushion 14.

Furthermore, a seat belt device (not illustrated in the drawings) for occupant restraint is disposed in the vehicle seat 12, and the seat belt device is a so-called 3-point seat belt device. For this reason, the waist of the front passenger seat occupant P is restrained by a lap belt, and the upper body of the front passenger seat occupant P is restrained by a shoulder belt. Note that the front passenger seat occupant P is an AM50 (50th percentile of an American adult male) dummy. Hereinafter, the front passenger seat occupant P will sometimes be called the "AM50 dummy P."

A driver's seat (not illustrated in the drawings) is disposed on the left side of the vehicle seat 12. Additionally, a center console 18 is placed in the vehicle width direction center portion (specifically, between the vehicle seat for the driver's seat and the vehicle seat 12 for the front passenger seat) of the automobile V. Namely, the automobile V of the present exemplary embodiment has a configuration in which a center seat is not placed between the vehicle seat for the driver's seat and the vehicle seat 12 for the front passenger seat. Note that the automobile V may also have a configuration not equipped with the center console 18 (e.g., a configuration in which the space between the right and left vehicle seats 12 can be a passageway).

An instrument panel 20 extending in the vehicle width direction is disposed on the front side of the vehicle seat 12, and a center panel 20A is disposed in the vehicle width direction center portion of the instrument panel 20. Additionally, the front end of the center console 18 is connected to the center panel 20A.

As illustrated in FIG. 1, the front passenger seat airbag device 10 includes a module case 22, an airbag 24, an inflator 42 that is a gas generating device, and a tether 36 serving as a coupling portion. The tether 36 will be described in detail in the description of the relevant portions of the exemplary embodiment.

The module case 22 is formed in the shape of a substantially rectangular box that is open upward. The module case 22 is placed inside the instrument panel 20 on the front side of the vehicle seat 12. The vehicle width direction centerline of the module case 22 is set at a position substantially coinciding with the seat width direction centerline of the vehicle seat 12. Furthermore, the module case 22 is supported by an instrument panel reinforcement (not illustrated in the drawings) extending in the vehicle width direction inside the instrument panel 20. Additionally, an airbag door (not illustrated in the drawings) is formed in a section of the instrument panel 20 that covers the module case 22 from above.

The airbag 24 is, as an example, formed as a bag as a result of plural cloths being sewn together at their outer peripheral edge portions. The airbag 24 is normally housed in a folded-up state inside the module case 22 and becomes inflated and deployed when gas generated from the inflator 42 is supplied to the inside of the airbag 24. The airbag 24 includes a bag main body portion 26 and a center bag portion 28. The bag main body portion 26 serves as a main body that becomes inflated and deployed in front of the front passenger seat occupant P. The center bag portion 28 serves as a projecting bag portion that becomes inflated and deployed on one vehicle width direction side (here, the vehicle width direction center side) of the bag main body portion 26.

The bag main body portion 26 includes a left bag portion 26L and a right bag portion 26R, and becomes inflated and deployed in a substantially bilaterally symmetrical shape as seen in a plan view. Furthermore, the boundary line between the left bag portion 26L and the right bag portion 26R (Namely, the vehicle width direction centerline of the bag main body portion 26) substantially coincides with the vehicle width direction centerline of the module case 22. Furthermore, a recess portion 26C, that is open rearward, is formed in the vehicle width direction center portion (the section between the left bag portion 26L and the right bag portion 26R) of the rear end portion of the inflated and deployed bag main body portion 26, and the recess portion 26C positioned in front of a head H of the front passenger seat occupant P. Additionally, the surfaces of the left bag portion 26L and the right bag portion 26R that face rearward at the time of inflation and deployment form an occupant restraining surface 26A that restrains the upper body (including the head H) of the front passenger seat occupant P at the time of a head-on impact to the automobile V.

Furthermore, the inflated and deployed bag main body portion 26 is configured to come into abutting contact with a windshield glass (not illustrated in the drawings) of the automobile V and the instrument panel 20. Accordingly, the inflated and deployed bag main body portion 26 is supported from the front side by the windshield glass and the instrument panel 20.

Figure 3:
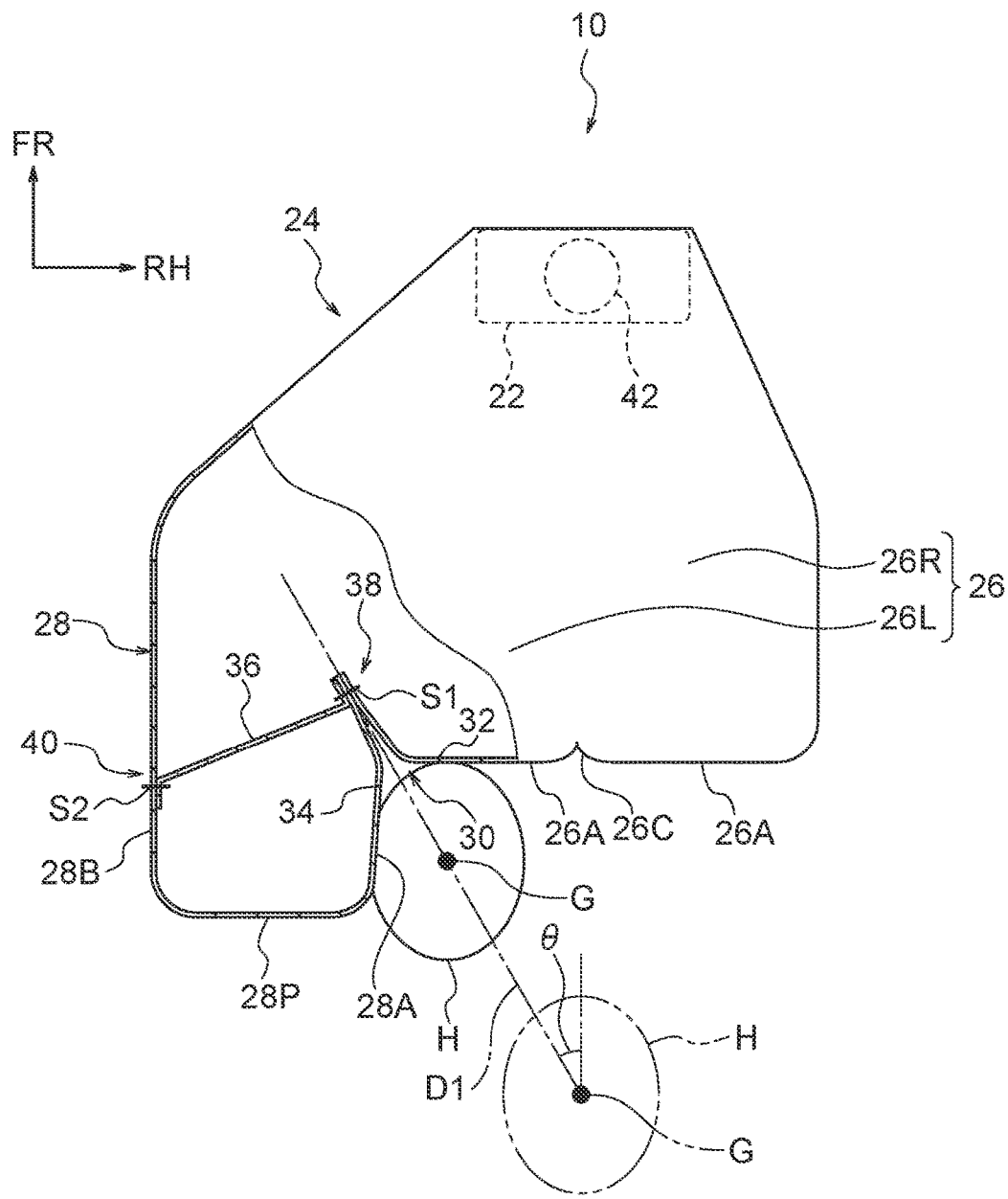
FIG. 3 is a partial sectional view illustrating, as cut in a position corresponding to line F3-F3 in FIG. 2, part of the airbag illustrated FIG. 1.

As illustrated in FIG. 3, the center bag portion 28 is communicated with the bag main body portion 26 and becomes inflated and deployed in the forward and rearward direction adjacent to the vehicle width direction center side of the bag main body portion 26. Specifically, the center bag portion 28 is offset to the vehicle width direction center side of the later-described inflator 42 and becomes inflated and deployed in the forward and rearward direction on the upper side of the center console 18. Accordingly, the airbag 24 is expanded to the vehicle width direction center side and becomes inflated and deployed in a bilaterally asymmetrical shape as seen in a plan view.

Furthermore, the center bag portion 28 is formed in a substantially rectangular shape in which longitudinal direction coincides with the forward and rearward direction, as seen in a plan view at the time of the inflation and deployment. The center bag portion 28 has a projecting portion 28P that projects in the rearward direction beyond the occupant restraining surface 26A of the inflated and deployed bag main body portion 26A. The projecting portion 28P projects in the rearward direction in a position offset to the upper side of the vertical direction center of the inflated and deployed bag main body portion 26. The projecting portion 28P is formed so as to be positioned obliquely on the left and front side of the head H of the front passenger seat occupant P. The surface of the projecting portion 28P that faces rightward (outward in the vehicle width direction; the bag main body portion 26 side) at the time of the inflation and deployment is an oblique impact restraining surface 28A that restrains the head H of the front passenger seat occupant P at the time of an oblique impact to the vehicle V. At the time of an oblique impact to the left side of the automobile V, the left shoulder of the front passenger seat occupant P that moves obliquely leftward and forward moves into the space under the projecting portion 28P.

Moreover, in the inflated and deployed state of the center bag portion 28, the center bag portion 28 is configured to come into abutting contact with the center panel 20A of the instrument panel 20. Accordingly, in the inflated and deployed state of the center bag portion 28, the center bag portion 28 is supported from the front side by the instrument panel 20.

As illustrated in FIG. 1, the inflator 42 is placed in the vehicle width direction center portion of the module case 22. The inflator 42 is a so-called disk inflator, is formed in a hollow, substantially cylindrical shape, and is secured to the bottom wall of the module case 22 in such a way that its axial direction coincides with the vertical direction. The upper portion of the inflator 42 serves as a gas discharge portion and is housed inside the front end portion of the bag main body portion 26. Plural gas discharge holes not illustrated in the drawings are formed in the outer peripheral surface of the gas discharge portion, and the plural gas discharge holes are arranged side by side at predetermined intervals along the circumferential direction of the inflator 42. Accordingly, the gas generated by the inflator 42 is discharged radially from the inflator 42 as seen in a plan view.

The inflator 42 is electrically connected to an airbag ECU 44 (a control device). In a case in which the inflator 42 is activated by the airbag ECU 44, the airbag 24 receives a supply of gas from the inflator 42 and becomes inflated and deployed. At this time, the non-illustrated airbag door disposed in the instrument panel 20 receives the inflation pressure of the airbag 24 and is burst open.

An impact sensor (or sensor group) 46 is electrically connected to the airbag ECU 44. The airbag ECU 44 can detect or predict a frontal impact to the automobile V on the basis of information from the impact sensor 46. The airbag ECU 44 activates the inflator 42 in a case in which the airbag ECU 44 detects or predicts a frontal impact on the basis of the information from the impact sensor 46. Types of the frontal impact include an oblique impact. Note that an oblique impact (MDB oblique impact) is an impact in an oblique forward direction as defined, for example, by the National Highway Traffic Safety Administration (NHTSA) (as an example, an impact in which the relative angle with the crash partner is 15° and the amount of overlap in the vehicle width direction is about 35%). In the present exemplary embodiment, as an example, an oblique impact at a relative velocity of 90 km/hr is envisioned.

In the present exemplary embodiment, a slit 30 serving as a gap portion is formed between the bag main body portion 26 and the center bag portion 28 of the airbag 24. As illustrated in FIG. 3, the slit 30 is formed between a base cloth 32 configuring the bag main body portion 26 and a base cloth 34 configuring the center bag portion 28, and is set so as to extend in the forward direction beyond the occupant restraining surface 26A at the time of the inflation and deployment of the airbag 24. Additionally, the base cloths 32 and 34 are sewn (joined) together at a seam portion S1 disposed in the front end portion (terminal end portion) of the slit 30. Note that the reference signs for the base cloths 32 and 34 are omitted from the drawings except in FIG. 3 and FIG. 4.

The slit 30 is formed so as to open rearward and downward at the time of the inflation and deployment of the airbag 24. Namely, in the inflated and deployed state of the airbag 24 the rear end portion and the lower end portion of the slit 30 are open while the upper end portion of the slit 30 is closed. Note that in the inflated and deployed state the lower end portion of the slit 30 may also be closed. The slit 30 is formed so as to extend along the moving direction of a center of gravity G of the head H of the front passenger seat occupant P at the time of an oblique impact to the left side of the automobile V in a case in which the inflated and deployed state of the airbag 24 is seen in a plan view. For this reason, at the time of an oblique impact to the left side, the front passenger seat occupant P moves obliquely leftward and forward, the head H of the front passenger seat occupant P moves into the slit 30.

As mentioned above, the relative angle between the automobile V and the impact partner is set to 15° in the definition by the NHTSA for an oblique impact to the automobile V. Additionally, in an automobile oblique impact test using a dummy based on this definition, it became clear that the moving direction of the head H of the front passenger seat occupant P is inclined substantially 25° relative to the vehicle forward and rearward direction as seen in a plan view. For this reason, in the present exemplary embodiment, in a case in which the inflated and deployed state of the airbag 24 is seen in a plan view, an angle of inclination θ (see FIG. 3) of the slit 30 relative to the vehicle forward and rearward direction is set within the range of 20 degrees to 30 degrees, for example. Furthermore, long dashed short dashed line D1 in FIG. 3 to FIG. 6B is a hypothetical line that crosses through the center of gravity G and lies along the moving direction of the center of gravity G of the head H (the direction in which the head H moves into the slit 30) in a case in which the oblique impact test has been implemented with respect to the left side of the automobile V.

Furthermore, in the present exemplary embodiment, the tether 36 (coupling portion), which is formed as a rectangular sheet, is disposed inside the center bag portion 28 of the airbag 24. The tether 36 is formed as a result of a sheet-like material that is flexible (here, the same cloth as the base cloth of the airbag 24) being cut out in the shape of a rectangular strip. The tether 36 is placed in the vertical direction center portion of the inside of the center bag portion 28 in such a way that its width direction coincides with the substantially vertical direction. The tether 36 couples together (interconnects) a first attachment portion 38 set at the airbag 24 on the front end portion side of the slit 30 and a second attachment portion 40 set at a side portion 28B of the center bag portion 28 on the opposite side of the bag main body portion 26 side.

Specifically, one longitudinal direction end portion of the tether 36 is sewn (joined) to the first attachment portion 38 at the seam portion S1. The other longitudinal direction end portion of the tether 36 is sewn (joined) to the base cloth 34 of the center bag portion 28 at a seam portion S2 disposed in the second attachment portion 40. Accordingly, the tether 36 is attached to the first attachment portion 38 and the second attachment portion 40 and bridges the first attachment portion 38 and the second attachment portion 40. The second attachment portion 40 is set so as to be positioned further in the vehicle rearward direction than the first attachment portion 38 at the time of the inflation and deployment of the airbag 24. Additionally, the length dimension of the tether 36 is set in such a way that the tether 36 becomes stretched (tighten) between the first attachment portion 38 and the second attachment portion 40 at the time of the inflation and deployment of the airbag 24. Namely, the tether 36 is inclined so as to head leftward (the opposite side of the bag main body portion 26 side) heading rearward in a case in which the inflated and deployed state of the airbag 24 is seen in a plan view.

Furthermore, the tether 36 is set so as to be positioned at a height coinciding with the head H in a case in which the state in which the head H of the front passenger seat occupant P (here, the AM50 dummy P) has moved into the slit 30 in the inflated and deployed airbag 24 is viewed obliquely from the left and front. Note that, also in a case in which the front passenger seat occupant P is an AF05 dummy (50th percentile of an American adult female), it is preferred that the head of the AF05 dummy and the tether 36 coincide with each other in the way described above in a state in which the head of the AF05 dummy has moved into the slit 30 in the way described above.

Next, the action and effects of the present exemplary embodiment will be described.

In the front passenger seat airbag device 10 having the configuration described above, in a case in which the airbag ECU 44 detects or predicts a frontal impact to the automobile V on the basis of a signal from the impact sensor 46, the inflator 42 is activated by the airbag ECU 44. Accordingly, the airbag 24 that has received a supply of gas from the inflator 42 becomes inflated and deployed while causing the airbag door disposed in the instrument panel 20 to burst open. Additionally, the bag main body portion 26 becomes inflated and deployed in front of the front passenger seat occupant P, the center bag portion 28 becomes inflated and deployed on the vehicle width direction center side of the bag main body portion 26, and the projecting portion 28P of the center bag portion 28 projects in the rearward direction beyond the bag main body portion 26. Furthermore, in the airbag 24, the slit 30 that opens rearward is formed between the bag main body portion 26 and the center bag portion 28.

In a case in which the frontal impact is a head-on impact (full overlap frontal impact), the front passenger seat occupant P moves forward due to inertial force (see arrow A in FIG. 1). Note that, since the front passenger seat occupant P is wearing the 3-point seat belt device, the forward movement of the front passenger seat occupant P is such that the upper body of the front passenger seat occupant P tilts forward at the waist. Additionally, the head H of the front passenger seat occupant P that moves forward comes into contact with the occupant restraining surface 26A of the bag main body portion 26. At this time, a reaction force acts on the bag main body portion 26 from the instrument panel 20 and the windshield glass, so the head H of the front passenger seat occupant P is supported by the bag main body portion 26 and the movement of the head H is limited. As a result, at the time of a head-on impact to the vehicle V, the head H of the front passenger seat occupant P that moves forward may be restrained (protected) by the bag main body portion 26.

In a case in which the frontal impact is an oblique impact to the left side (the driver's seat side), the front passenger seat occupant P moves forward due to inertial force while moving toward the left side, which is the impact side in the vehicle width direction, relative to the vehicle body as indicated by arrow B in FIG. 1. Namely, the front passenger seat occupant P moves obliquely leftward and forward (toward the vehicle width direction center side and forward). In this case, the head H of the front passenger seat occupant P moves into the slit 30 in the airbag 24.

Here, in the present exemplary embodiment, the tether 36 is disposed inside the center bag portion 28 of the airbag 24. The tether 36 couples together the first attachment portion 38 set at the airbag 24 on the front end portion side of the slit 30 and the second attachment portion 40 set at the side portion 28B of the center bag portion 28 on the opposite side of the bag main body portion 26 side. Additionally, at the time of the inflation and deployment of the airbag 24, the tether 36 becomes stretched between the first attachment portion 38 and the second attachment portion 40 positioned further in the rearward direction than the first attachment portion 38. For this reason, in a case in which the head H of the front passenger seat occupant P that has moved into the slit 30 bottoms in the front end portion of the slit 30, tension acting on the tether 36 increases, and the center bag portion 28 receives a force toward the other vehicle width direction side (the right side). Accordingly, the center bag portion 28 is prevented or restrained from collapsing to the one vehicle width direction side (the left side; the opposite side of the bag main body portion 26 side) due to the load from the head H. As a result, the head H may be prevented or restrained from turning about the axis of the neck (not illustrated in the drawings) of the front passenger seat occupant P in accompaniment with the collapse of the center back portion 28.

Figure 6A:
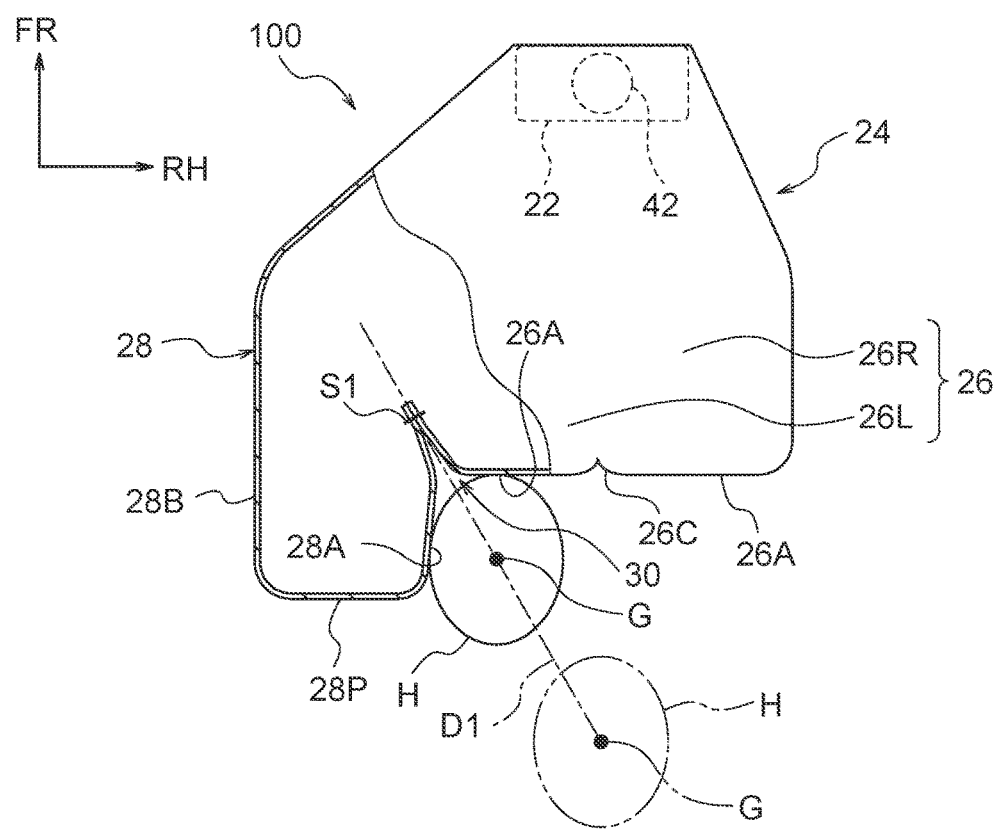
FIG. 6A is a plan view illustrating an inflated and deployed state of an airbag in a vehicle airbag device according to a comparative example.
Figure 6B:
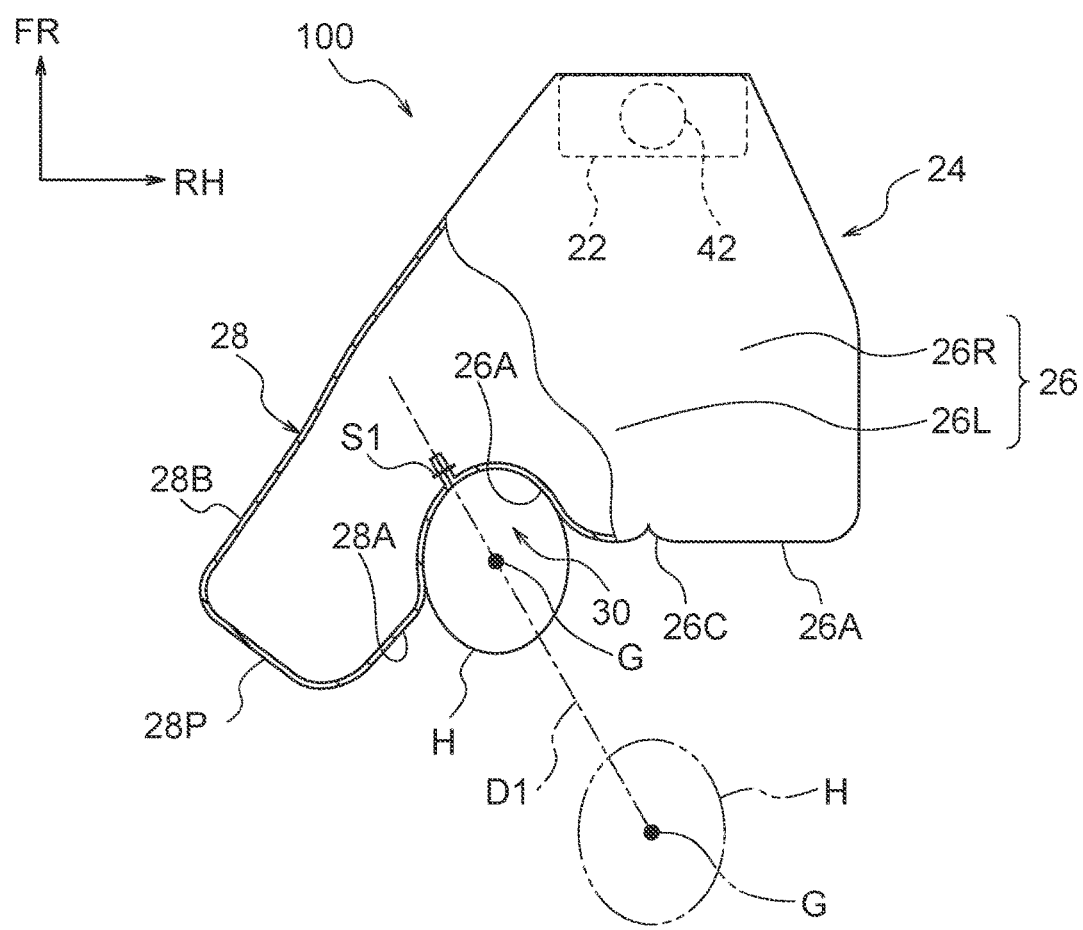
FIG. 6B is a plan view, corresponding to FIG. 6A, illustrating a state in which the head of an occupant has bottomed in a front end portion of a slit in the airbag according to the comparative example.

This effect will be described using comparative example 100 illustrated in FIG. 6A and FIG. 6B. Comparative example 100 has the same configuration as that of the exemplary embodiment except that it is not equipped with the tether 36. Namely, the center bag portion 28 and the slit 30 are set, like in the exemplary embodiment, in the airbag 24 according to comparative example 100, and the head H moves into the slit 30 at the time of an oblique impact to the left side of the automobile V. Accordingly, the head H can be restrained from turning about the axis of the neck compared to a configuration in which the slit 30 is not set. However, in a case in which the head H moves into the slit 30 until it bottoms in the front end portion of the slit 30, the center bag portion 28 becomes unable to hold its shape and collapses to the opposite side of the bag main body portion 26 side (see FIG. 6B). As a result, the input from the side (the impact side) to the head H decreases, and thus, restraining the head from turning may be diminished.

Figure 4:
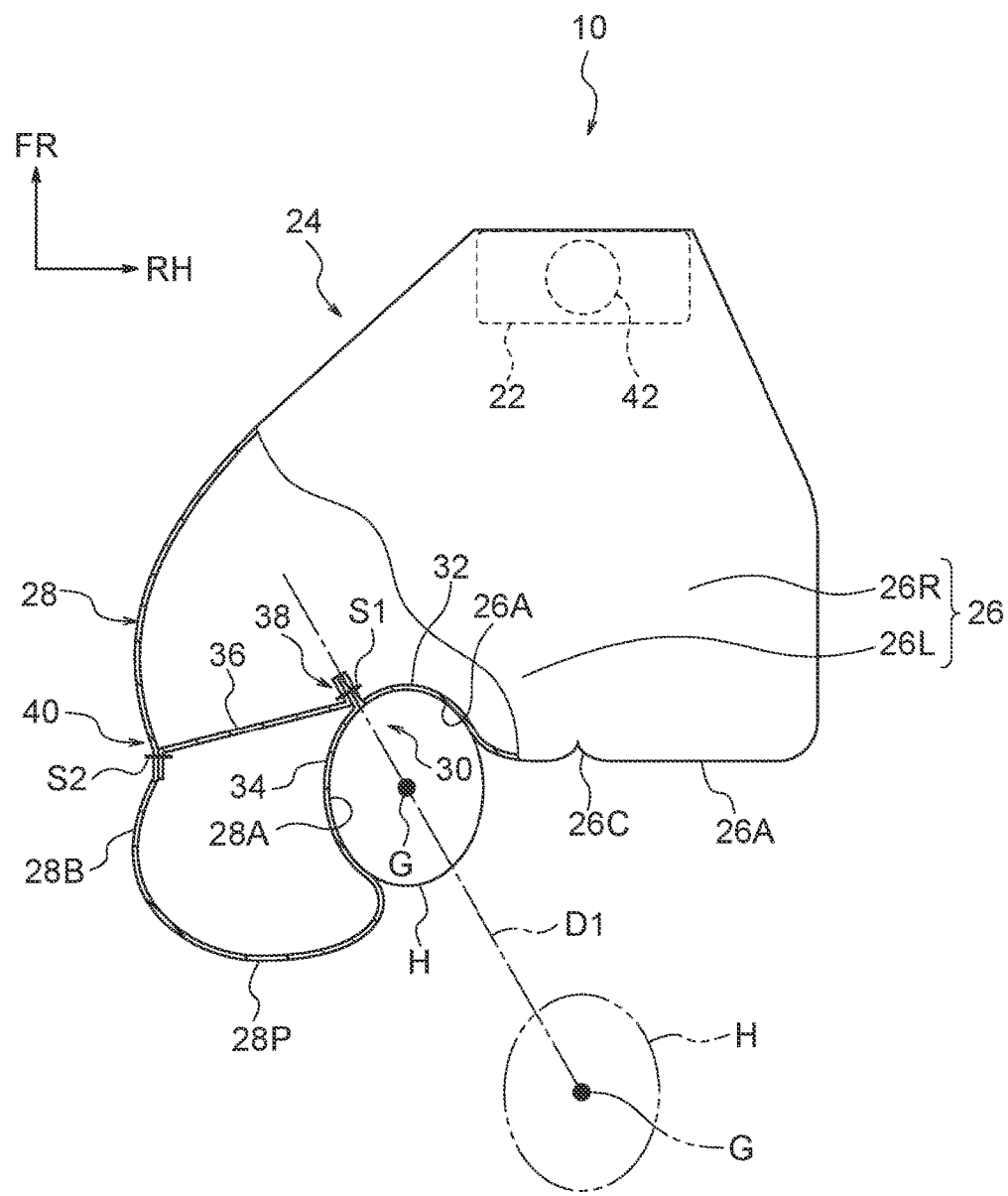
FIG. 4 is a partial sectional view, corresponding to FIG. 3, illustrating a state in which the head of an occupant has bottomed in a front end portion of a slit in the airbag.

In this respect, in the present exemplary embodiment, as described above, in a case the head H moves into the slit 30 until it bottoms in the front end portion of the slit 30, the tension acting on the tether 36 increases. As a result, the section of the center bag portion 28 on the projecting portion 28P side receives a force in a direction in which it turns about the first attachment portion 38 toward the bag main body portion 26. Accordingly, as illustrated in FIG. 4, the center bag portion 28 becomes pulled toward the head H and wraps around the head H from the impact side. Thus, the input from the impact side continues to act on the head H, so a diminishment in restraining the head from turning may be avoided. In the present exemplary embodiment, the head H of the front passenger seat occupant P may be effectively protected at the time of an oblique impact by the combination of the slit 30 and the tether 36.

Figure 5B:
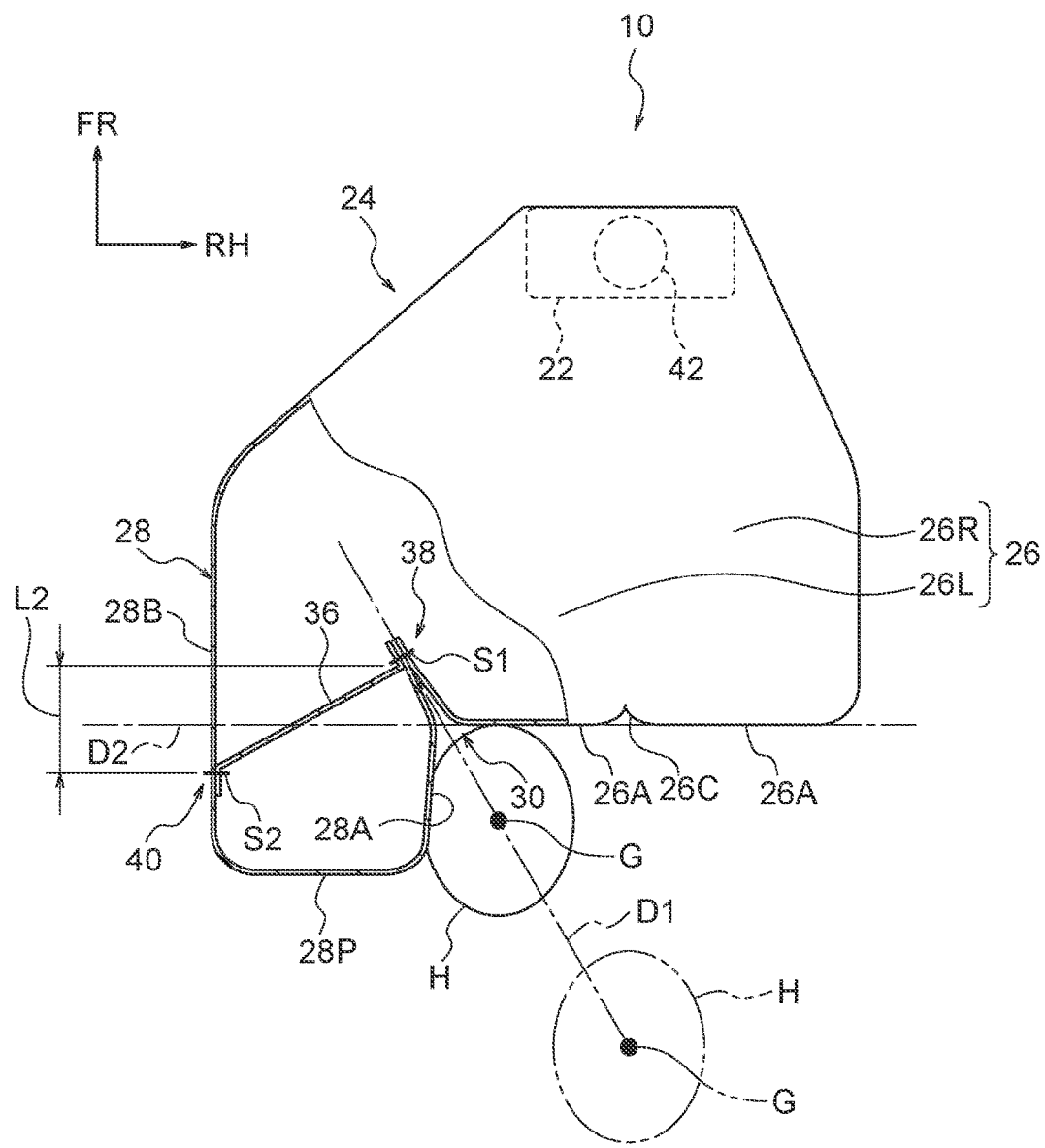
FIG. 5B is a partial sectional view, corresponding to FIG. 3, illustrating a case in which the second attachment portion is positioned further in the vehicle rearward direction than the occupant restraining surface of the bag main body portion at the time of the inflation and deployment of the airbag.

Furthermore, in the present exemplary embodiment, as illustrated in FIG. 5A to FIG. 5C, the effect of pulling the center bag portion 28 (the effect of preventing or restraining a collapse to the opposite side of the bag main body portion 26 side) may be easily adjusted by changing the position of the second attachment portion 40.

Namely, in the example illustrated in FIG. 5A, the second attachment portion 40 is configured to be positioned further in the forward direction than the rear end of the occupant restraining surface 26A of the bag main body portion 26 at the time of the inflation and deployment of the airbag 24. Furthermore, in the example illustrated in FIG. 5B, the second attachment portion 40 is configured to be positioned further in the rearward direction than the rear end of the occupant restraining surface 26A of the bag main body portion 26 at the time of the inflation and deployment of the airbag 24. Furthermore, in the example illustrated in FIG. 5C, the second attachment portion 40 is, in a state in which the head H of the front passenger seat occupant P (the AM50 dummy P) has come into contact with the occupant restraining surface 26A of the bag main body portion 26 at the time of the inflation and deployment of the airbag 24, configured to be positioned further in the rearward direction than the center of gravity G of the head H of the AM50 dummy P. Note that long dashed short dashed line D2 illustrated in FIG. 5A to FIG. 5C is a hypothetical line crossing through the rear end of the occupant restraining surface 26A and extending in the vehicle width direction. Furthermore, L1 illustrated in FIG. 5A is set smaller than L2 illustrated in FIG. 5B, and L2 illustrated in FIG. 5B is set smaller than L3 illustrated in FIG. 5C (L1<L2<L3).

In the example illustrated in FIG. 5B, the second attachment portion 40, which is the point at which the tension acts on the center bag portion 28 from the tether 36, is positioned further in the vehicle rearward direction than the rear end of the occupant restraining surface 26A of the bag main body portion 26 at the time of the inflation and deployment of the airbag 24. Accordingly, compared to a configuration in which the second attachment portion 40 is positioned further in the vehicle forward direction than the rear end of the occupant restraining surface 26A (the configuration illustrated in FIG. 5A), it becomes easier for the tension acting on the tether 36 to rapidly increase when the head H has bottomed in the front end portion of the slit 30.

Namely, in both of the examples illustrated in FIG. 5A and FIG. 5B, the first attachment portion 38 starts to become displaced obliquely leftward and forward along long dashed short dashed line D1 together with the head H as a result of the head H bottoming in the front end portion of the slit 30. At this time, in the first attachment portion 38, the amount of displacement in a direction away from the second attachment portion 40 is greater in the example illustrated in FIG. 5B than in the example illustrated in FIG. 5A. Accordingly, in the example illustrated in FIG. 5B, the tension acting on the tether 36 increases more rapidly than in the example illustrated in FIG. 5A. As a result, in the example illustrated in FIG. 5B, the effect of preventing or restraining a collapse of the center bag portion 28 is enhanced compared to the example illustrated in FIG. 5A.

Furthermore, in the example illustrated in FIG. 5C, the second attachment portion 40 is, in a state in which the head H of the AM50 dummy P has come into contact with the occupant restraining surface 26A at the time of the inflation and deployment of the airbag 24, positioned further in the vehicle rearward direction than the center of gravity G of the head H. Accordingly, compared to a configuration in which the second attachment portion 40 is positioned further in the vehicle forward direction than the center of gravity G in the above-described state (the configuration illustrated in FIG. 5B), it becomes easier for the tension acting on the tether 36 to rapidly increase when the head H has bottomed in the front end portion of the slit 30.

Namely, in the example illustrated in FIG. 5C also, the first attachment portion 38 starts to become displaced obliquely leftward and forward along long dashed short dashed line D1 together with the head H as a result of the head H bottoming in the front end portion of the slit 30. At this time, in the first attachment portion 38, the amount of displacement in a direction away from the second attachment portion 40 is greater in the example illustrated in FIG. 5C than in the example illustrated in FIG. 5B. Accordingly, in the example illustrated in FIG. 5C, the tension acting on the tether 36 increases more rapidly than in the example illustrated in FIG. 5B. As a result, in the example illustrated in FIG. 5C, the effect of preventing or restraining a collapse of the center bag portion 28 is enhanced compared to the example illustrated in FIG. 5B.

Furthermore, in the above exemplary embodiment, the tether 36 made of the same cloth as the base cloth of the airbag 24 is attached to the airbag 24. Accordingly, the tether 36 may be manufactured using scraps obtained when cutting out the base cloth of the airbag 24, and thus, the yield of the material of the airbag 24 and the tether 36 may be improved.

In the above exemplary embodiment, the tether 36 serving as a coupling portion is attached to the airbag 24. However, the present disclosure is not limited thereto. The coupling portion may also be formed by an extension portion obtained by extending part of the base cloth of the airbag.

Furthermore, in the above exemplary embodiment, the tether 36 is formed as a rectangular sheet. However, the present disclosure is not limited thereto. The shape of the coupling portion may be changed appropriately. For example, the tether 36 may also be formed as a trapezoidal sheet. In such case, it is preferred that the upper side of the trapezoidal tether 36 be attached to the first attachment portion 38 and that the lower side be attached to the second attachment portion 40. According to the above case, stress acting on the second attachment portion 40 may be distributed.

Furthermore, in the above exemplary embodiment, the bag main body portion 26 serving as the main body is configured to include the left bag portion 26L and the right bag portion 26R. However, the present disclosure is not limited thereto. The configuration of the main body may be changed appropriately.

Furthermore, in the above exemplary embodiment, a case in which the front passenger seat airbag device 10 serves as the vehicle airbag device according to the present disclosure, has been described. However, the present disclosure is not limited thereto. For example, the vehicle airbag device according to the present disclosure may also be applied as a driver's seat airbag device in a case in which a steering device is not disposed in front of the driver's seat in a self-driving vehicle.

In addition, the present disclosure can be changed and implemented in a variety of ways without departing from the spirit thereof. Furthermore, the scope of rights of the present disclosure is not limited to the exemplary embodiment.

What is claimed is:

1. A vehicle airbag device, comprising:
an airbag that, upon receiving a supply of gas, inflates and deploys to an inflated and deployed state, the airbag comprising
a main body that inflates and deploys at a vehicle front side of an occupant,
a projection that inflates and deploys at a vehicle width direction side of the main body and projects in a vehicle rearward direction beyond the main body, and
a gap portion that is between the main body and the projection, and opens in the vehicle rearward direction; and
a coupling portion that couples together
a first attachment portion set at the airbag at a front end portion side of the gap portion, and
a second attachment portion set at a side portion of the projection, which side portion is opposite to the main body,
wherein, at a time of the inflation and deployment of the airbag, the coupling portion stretches between the first attachment portion and the second attachment portion, which is positioned further in the vehicle rearward direction than the first attachment portion, and
wherein, in a plan view of the airbag in the inflated and deployed state,
the gap portion opens in an opening direction that is inclined with respect to both a vehicle forward and rearward direction and a vehicle width direction, and
an angle of inclination between the opening direction of the gap portion and the vehicle forward and rearward direction is within a range of 20 degrees to 30 degrees.

2. The vehicle airbag device according to claim 1, wherein:
a surface of the main body, that faces the vehicle rearward direction at the time of the inflation and deployment, is an occupant restraining surface; and
the second attachment portion is positioned further in the vehicle rearward direction than a rear end of the occupant restraining surface at the time of the inflation and deployment.

3. The vehicle airbag device according to claim 2, wherein, in a state in which a head of an AM50 dummy serving as the occupant has come into contact with the occupant restraining surface at the time of the inflation and deployment, the second attachment portion is positioned further in the vehicle rearward direction than a center of gravity of the head of the AM50dummy.

4. The vehicle airbag device according to claim 1, wherein:
a surface of the main body, that faces the vehicle rearward direction at the time of the inflation and deployment, is an occupant restraining surface; and
the second attachment portion is positioned, in the vehicle rearward direction, between the first attachment portion and a rear end of the occupant restraining surface at the time of the inflation and deployment.

5. The vehicle airbag device according to claim 1, wherein:
the gap portion is a slit formed between a first wall of the main body of the airbag and a second wall of the projection of the airbag, and
in the plan view of the airbag in the inflated and deployed state, both the first wall of the main body of the airbag and the second wall of the projection of the airbag are inclined with respect to both the vehicle forward and rearward direction and the vehicle width direction, to define the inclined opening direction of the gap portion.

6. The vehicle airbag device according to claim 5, wherein the first wall of the main body of the airbag and the second wall of the projection of the airbag are joined together at a seam portion which defines a bottom of the gap portion and which is also the first attachment portion where the coupling portion is joined to the airbag.

7. The vehicle airbag device according to claim 1, wherein the gap portion has size sufficient to cover more than half of a circumference of a head of an AM50 dummy when the head of the AM50 dummy is received in the gap portion in the inflated and deployed state of the airbag.

* * * * *